United States Patent [19]

Theurer et al.

[11] Patent Number: 5,573,080
[45] Date of Patent: Nov. 12, 1996

[54] WORK CAR

[75] Inventors: Josef Theurer, Vienna; Leopold R. Gruber, Scheibbs; Friedrich Oellerer, Linz, all of Austria

[73] Assignee: Franz Plasser Bahnbaumaschinen-Industriegesellschaft m.b.H., Vienna, Austria

[21] Appl. No.: 370,001

[22] Filed: Jan. 9, 1995

[30] Foreign Application Priority Data

Jan. 12, 1994 [AT] Austria .................................... 34/94

[51] Int. Cl.⁶ ......................................................... B66F 11/04
[52] U.S. Cl. ........................... 182/63; 182/2; 182/127
[58] Field of Search ................................. 182/63, 2, 127; 105/425, 72.2; 104/2

[56] References Cited

U.S. PATENT DOCUMENTS 3,927,732  12/1975  Ooka ................................. 182/63 X
5,016,544  5/1991   Woollam ......................... 105/72.2 X

FOREIGN PATENT DOCUMENTS 421977   4/1991   European Pat. Off. ............... 182/127
1698182  12/1991  U.S.S.R. ................................ 182/63

Primary Examiner—Alvin C. Chin-Shue
Attorney, Agent, or Firm—Henry M. Feiereisen

[57] ABSTRACT

A track-bound work car includes a machine frame supported on undercarriages for mobility in an operating direction on a track and carrying a body structure with an operator's cab. A vertically adjustable main working platform is mounted to a jib which is secured to the machine frame, and a second working platform is detachably fixed via suitable fasteners to the body structure. Both working platforms are provided with complementary coupling elements to allow a detachable securement of the second working platform to the main working platform.

7 Claims, 2 Drawing Sheets

WORK CAR

BACKGROUND OF THE INVENTION

The present invention refers to a work car, and in particular to a work car of a type having a machine frame supported on undercarriages and carrying a body structure with an operator's cabin and a vertically adjustable working platform.

The publication "Railway Gazette International, September 1987, page 580" discloses a self-propelled tower car with a working platform which is telescopically extendible in vertical direction by a scissors-type jack to enable a substantially doubling of the working area. A tower car of this type has the drawback that the working platform is enlargeable only in a direction transversely to the track. In a direction longitudinally to the track, two working stands may be manually arranged at a raised level relative to the working platform which offer space at best for one single operator. Thus, a self-propelled tower car of this type enables only a slight expansion of the operating range in a direction transversely to the track.

European Patent No. 0 003 727 B1 describes another self-propelled tower car which includes a working platform and a jib secured to one end of the working platform and supporting a working stand. The working platform is secured to the body structure of the tower car and is composed of two platform sections which oppose each other in direction transversely to the machine frame and are slightly vertically adjustable by respective cylinder-piston units for movement into the working position.

SUMMARY OF THE INVENTION

It is an object of the present invention to provide an improved track-bound work car, obviating the afore-stated drawback.

In particular, it is an object of the present invention to provide an improved track-bound work car with a working platform which can be selectively enlarged in a simple and rapid manner for carrying out certain operations.

These objects and others which will become apparent hereinafter are attained in accordance with the present invention by providing a main working platform and an additional second working platform which is detachably secured via suitable fasteners to the body structure and provided with coupling elements which are engageable with complementary coupling elements of the main working platform for connection of both working platforms with each other.

The provision of a separate second working platform, which can be secured to the main working platform, enables an expansion of the overall working area in a very simple and rapid manner without requiring complicated structures for docking the second working platform and without increase of the own weight of the working platform. Moreover, the expanded working platform can be adjusted and moved in an unrestricted manner, e.g. by a jib, to thereby create a greatest possible application for both working platforms. The arrangement of the second working platform upon the body structure does not interfere with the freedom of movement of the main working platform or other devices which may be mounted on the work car.

Preferably, the complementary coupling elements on both working platforms are hydraulically remote-controlled components so as to substantially shorten the change-over time while yet assuring a safe connection between the working platforms.

Suitably, the fasteners and the coupling elements are arranged underneath the bottom of the working platforms to thereby significantly increase the operating safety while attaining an expansion or shortening of the main platform in a very rapid manner. In particular, it is advantageous to synchronize the operation between the coupling elements and the fasteners to each other such that the fasteners release the second working platform when the coupling elements connect the second working platform to the main working platform.

According to a further embodiment of the present invention, a telescopically extendible and vertically adjustable jib is secured to one end wall of the main working platform, with the coupling elements being arranged on the jib-distant end wall of the working platform. Thus, the main working platform can be maneuvered essentially without any constrictions in the normal as well as in expanded configuration for allowing work on the catenary or the like.

Suitably, the drive unit for vertically adjusting the jib is operatively connected to a hydraulic two-pressure system to enable operation of the drive unit at two different operating pressures whereby the fasteners are automatically activated when the drive unit runs at the higher working pressure. In this manner, the power required for vertically moving the jib by the drive unit is automatically adjusted.

In order to limit the rotation of the jib in dependence of the operation of the working platform, the drive effecting the rotation of the jib about a vertical axis is provided with a stop mechanism which allows the rotation about a greater angle when the second working platform is disengaged from the main working platform and limits the rotation about a smaller angle when the main working platform is extended by the second working platform. A control unit is suitably connected to the drive for automatically limiting the rotation of the jib to the smaller angle when the drive runs at the higher working pressure.

According to yet another feature of the present invention, the bottom of the main working platform is confined by a safety railing with two doors which are swingably supported for rotation about a vertical axis in the area of the end wall adjoining the attached second working platform, and locked by a suitable locking mechanism. In this manner, the safety railing can be extended in a very simple and effective manner when docking the second working platform to the main working platform.

BRIEF DESCRIPTION OF THE DRAWING

The above and other objects, features and advantages of the present invention will now be described in more detail with reference to the accompanying drawing in which.

Figure 1:
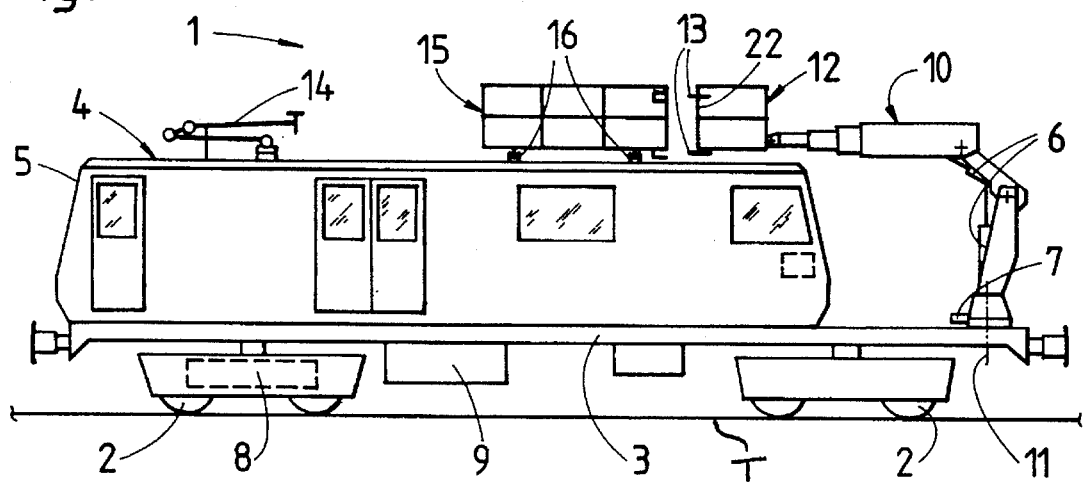
FIG. 1 is a side elevational view of a work car according to the present invention, illustrating a main working platform and a second working platform in an operational position in which the working platforms are separated from each other.
Figure 3:
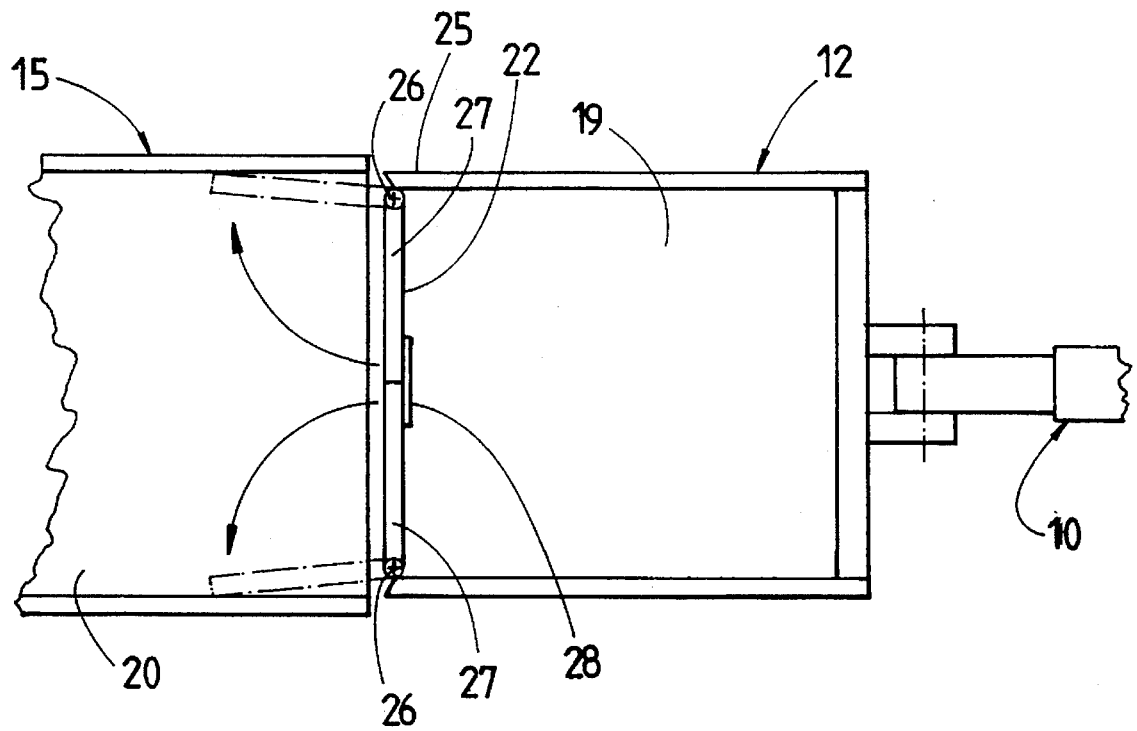

is a fragmentary side view, on an enlarged scale, of the work car of FIG. 1, illustrating the main working platform and the second working platform in another operational position in which the working platforms are connected together;

FIG. 3 is a simplified, fragmentary top view of both working platforms; and

Figure 4:
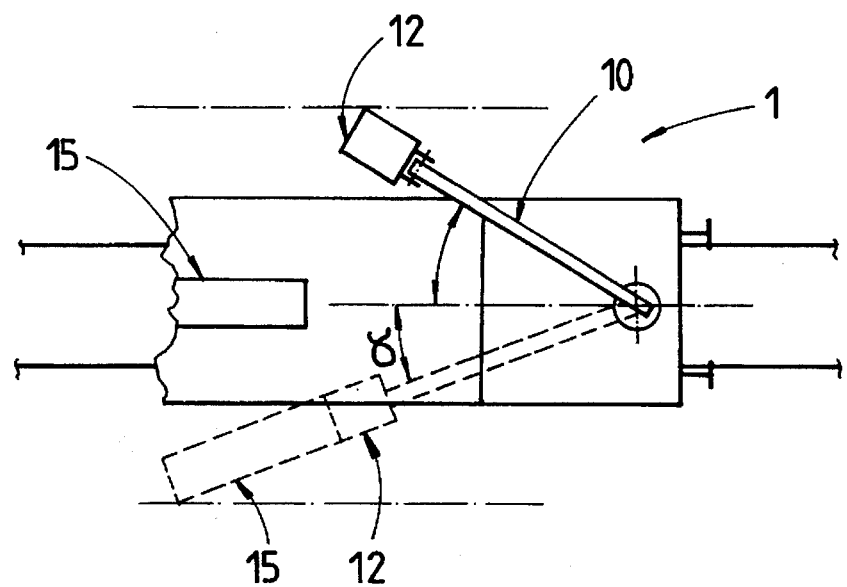

FIG. 4 is a schematic, simplified top view of the working platforms at different angular operating positions.

DETAILED DESCRIPTION OF PREFERRED EMBODIMENTS

Throughout all the Figures, the same or corresponding elements are always indicated by the same reference numerals.

Turning now to the drawing, and in particular to FIG. 1, there is shown a side elevational view of a work car according to the present invention, generally designated by reference numeral 1. The work car 1 has a machine frame 3, which is supported on undercarriages 2 for mobility on a track T, and a body structure 4 which houses essentially an operator's cab 5 and recreational rooms. The machine frame 3 is propelled by a drive 8 which acts upon one of the undercarriages 2, e.g. the undercarriage 2 at the left hand side of FIG. 1. Supported by the machine frame 3 on one end of the work car 1 is a telescopically extendible jib 10 which is vertically adjustable by a drive unit schematically illustrated by reference numeral 6. A further drive unit 7 rotates the jib 10 about a vertical axis 11. A power plant 9 is mounted underneath the machine frame 3 to supply power to the drive units 6, 7 for the jib 10 and to the drive 8. With its free cantilevered end, the jib 10 carries a main working platform 12 which is provided with upper and lower coupling elements 13 on one end wall 22 disposed in opposition to the jib 10. An auxiliary second working platform 15 is detachably mounted by fasteners 16 to the top of the body structure 4 which further supports a catenary measuring bow 14 at a distance to the working platform 15.

Figure 2:
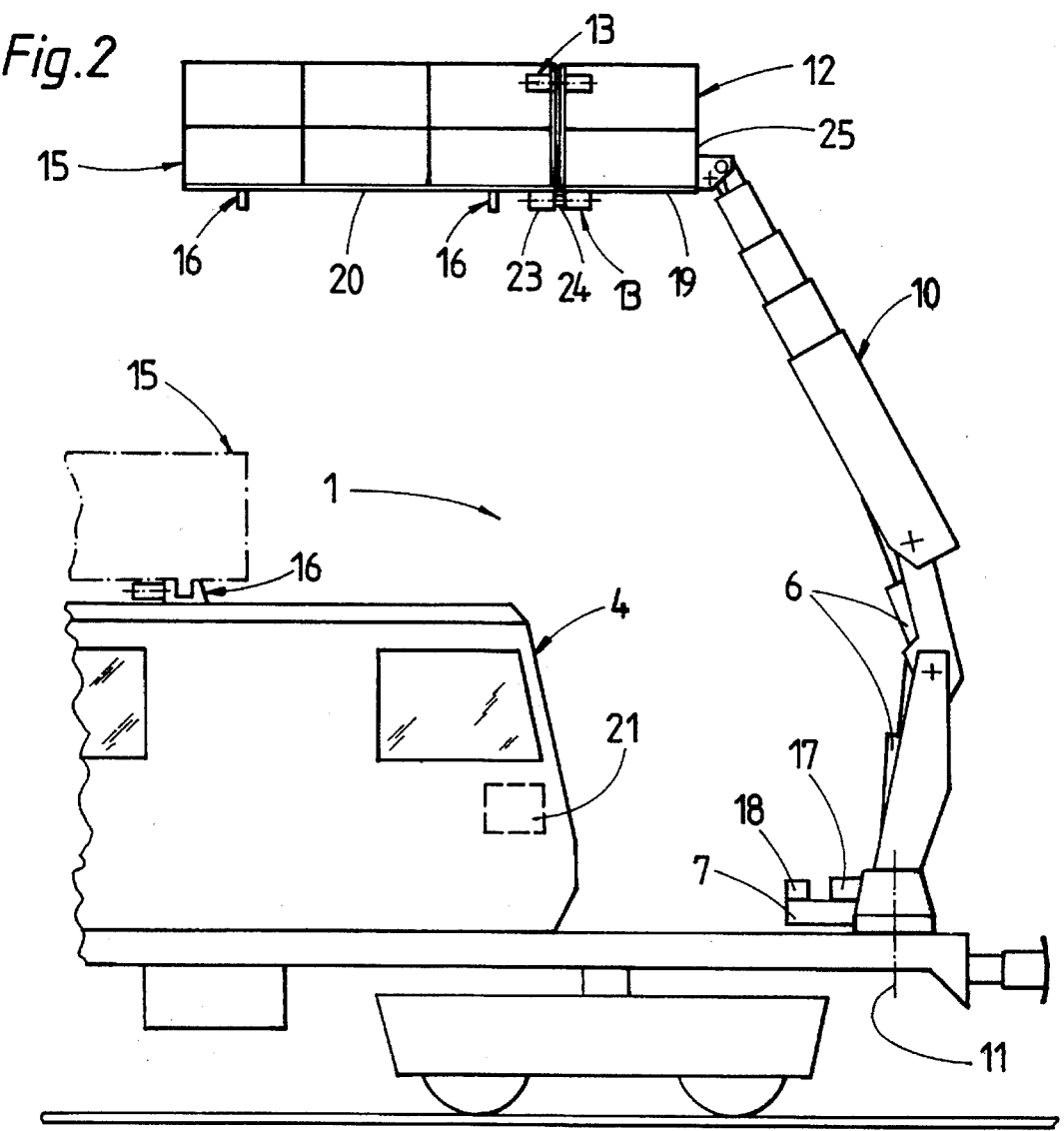

As shown in FIG. 2, which is an enlarged fragmentary side view of the work car 1, the second working platform 15 is provided with coupling elements 13 which complement the coupling elements 13 of the main working platform 12 for allowing attachment of the working platform 15 onto the working platform 12 through a suitable remote control so as to expand the working area for an operator. The coupling elements 13 on both working platforms 12, 15, and the fasteners 16 for the working platform 15 are synchronized in such a manner that the fasteners 16 release the working platform 15 upon activation of the coupling elements 13. For safety reasons, the release of the fasteners 16 is effected only after both working platforms 12, 15 are actually joined together by the coupling elements 13.

Persons skilled in the art will understand that the structure and operation of such coupling elements and fasteners are generally known so that a detailed showing and description thereof are omitted for sake of simplicity.

As shown in FIG. 2, the lower coupling elements 13 of the main working platform 12 are mounted underneath the bottom 19 thereof, and the lower coupling elements 13 as well as the fasteners 16 of the second working platform 15 are mounted underneath the bottom 20 thereof. In order to ensure an efficient operation, the jib 10 is equipped with a hydraulic plant 21 in form of a two-pressure system. As soon as the complementary coupling elements 13 of both working platforms 12, 15 are connected together, the drive unit 6 is operated at a higher working or operating pressure. This automatic switch is executed by distance detectors 23 which sense a displacement of a locking bolt 24 for securing the engagement of the complementary coupling elements 13.

The increased weight of the overall working area upon linkage of the working platform 15 with the working platform 12 requires a restriction of the rotation of the jib 10 to ensure a sufficient stability and to avoid a surpassing of the clearance gage. Therefore, the drive unit 7 is equipped with a stop mechanism 17 which allows the rotation about a vertical axis 11 at a greater angle when the second working platform 15 is disengaged from the main working platform 12 and limits the rotation to a smaller angle when the main working platform 12 is extended by the second working platform 15. A swinging of the jib 10 about a vertical axis 11 at the smaller angle is shown in FIG. 4 and designated by reference character α. Reference numeral 18 (FIG. 2) designates a control unit 18 which acts upon the stop mechanism 17 in such a manner that upon operation of the drive unit 6 at the higher operating pressure, i.e. when the working platform 15 is attached to the working platform 12, the jib 10 can swing only about the smaller angle α in order to ensure that the clearance gage, as indicated in dashdot line, will not be exceeded despite the enlarged working area.

As shown in FIG. 3, the bottom 19 of the working platform 12 is bounded by a safety railing 25 which is provided in the area of the end wall 22 adjoining the working platform 15 in docked condition with two doors 27 which are swingably mounted for rotation about a vertical axis 26. Upon use of the working platform 12 alone, the doors 27 are locked by a lock schematically indicated by reference numeral 28.

While the invention has been illustrated and described as embodied in a work car, it is not intended to be limited to the details shown since various modifications and structural changes may be made without departing in any way from the spirit of the present invention.

What is claimed as new and desired to be protected by Letters Patent is set forth in the appended claims:

We claims:

1. A track-bound work car, comprising:

a machine frame supported on undercarriages for mobility in an operating direction on a track and carrying a body structure housing an operator's cab;

a vertically adjustable first working platform supported on said machine frame;

a second working platform;

fastening means for securing said second working platform to said body structure; and coupling means mounted to said first and second working platforms for allowing a selective connection of said first and second working platforms with each other.

2. The work car of claim 1 wherein said first and second working platforms have a bottom, said fastening means being arranged underneath said bottom of said second working platform, and said coupling means being arranged underneath said bottom of said first and second working platforms.

3. The work car of claim 1, further comprising a control means for alternate activation of said coupling means and said fastening means in such a manner that said fastening means releases said second working platform when said first and second working platforms are linked by said coupling means, and that said fastening means is activated to secure said second working platform when said coupling means is passively switched for release.

4. The work car of claim 1 wherein said first working platform has opposing end walls, and further comprising a vertically adjustable telescopic jib connected to one of said end walls of said first working platform, said coupling means being arranged on the other one of said end walls.

5. The work car of claim 4, further comprising a drive unit for operating said jib and a hydraulic two-pressure system for supplying said drive unit with two different working pressures, wherein a switch for operation at a higher working pressure automatically effects an activation of said fastening means.

6. The work car of claim 5 wherein said drive unit includes a first drive for rotating said jib about a vertical pivot axis, said drive including a stop mechanism for limiting a rotation of said jib in dependence on the position of said working platforms to a first pivot angle and to a second smaller pivot angle, and a control unit cooperating with said drive for actuation of said stop mechanism to effect a rotation about the smaller pivot angle when said drive is operated by the higher working pressure.

7. The work car of claim 2, further comprising a safety railing bounding said bottom of said first working platform and including two doors which are swingably mounted for rotation about a vertical axis in the area of one end wall adjoining the attached second working platform, and a locking means for locking said doors.

* * * * *